(12) United States Patent
Jung

(10) Patent No.: US 9,924,775 B2
(45) Date of Patent: Mar. 27, 2018

(54) POWDER DISCHARGING CONTAINER

(71) Applicant: YONWOO CO., LTD., Incheon (KR)

(72) Inventor: Seo-Hui Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 15/113,711

(22) PCT Filed: Apr. 11, 2014

(86) PCT No.: PCT/KR2014/003135
§ 371 (c)(1),
(2) Date: Jul. 22, 2016

(87) PCT Pub. No.: WO2015/111796
PCT Pub. Date: Jul. 30, 2015

(65) Prior Publication Data
US 2017/0000236 A1    Jan. 5, 2017

(30) Foreign Application Priority Data

Jan. 24, 2014  (KR) .................. 10-2014-0008709

(51) Int. Cl.
*B67D 7/58* (2010.01)
*A45D 33/02* (2006.01)
(Continued)

(52) U.S. Cl.
CPC ............ *A45D 33/02* (2013.01); *B05B 7/1486* (2013.01); *B05B 11/0059* (2013.01);
(Continued)

(58) Field of Classification Search
CPC ..... A45D 33/02; B05B 11/02; B05B 11/0005; B05B 11/0059; B05B 11/0062;
(Continued)

(56) References Cited

U.S. PATENT DOCUMENTS 2,450,205 A * 9/1948 Rose .................. B05B 11/045
                                                222/215
2,580,580 A * 1/1952 Nicolle ............... B05B 11/0059
                                                222/211

(Continued)

FOREIGN PATENT DOCUMENTS

JP    2009-131410 A    6/2009
KR    10-0775650 B1    11/2007
(Continued)

OTHER PUBLICATIONS

International Search Report issued in PCT/KR2014/003135 dated Aug. 27, 2014.

*Primary Examiner* — Paul R Durand
*Assistant Examiner* — Randall Gruby
(74) *Attorney, Agent, or Firm* — Marshall, Gerstein & Borun LLP

(57) ABSTRACT

The present invention relates t o a powder-discharging container comprising an air passage and a powder passageway, which are formed on the inside of a stem, so that air and powder can pass through separately, thereby enabling spraying of powder passing through the powder passageway by means of air passing through the air passageway, when a button portion is pressed.

8 Claims, 5 Drawing Sheets

(51) Int. Cl.
  *B05B 11/00* (2006.01)
  *B05B 11/02* (2006.01)
  *G01F 11/00* (2006.01)
  *B05B 7/14* (2006.01)
  *B05B 11/06* (2006.01)
  *B05B 15/00* (2018.01)

(52) U.S. Cl.
  CPC ............ *B05B 11/02* (2013.01); *B05B 11/062* (2013.01); *B05B 11/3001* (2013.01); *B05B 11/3052* (2013.01); *B05B 15/005* (2013.01); *G01F 11/003* (2013.01); *B05B 11/0032* (2013.01); *B05B 15/002* (2013.01)

(58) Field of Classification Search
  CPC ............ B05B 11/0064; B05B 11/0067; B05B 11/0091; B05B 11/3001–11/3026
  See application file for complete search history.

(56) References Cited

U.S. PATENT DOCUMENTS

| | | | | | |
|---|---|---|---|---|---|
| 2,840,277 | A | * | 6/1958 | Bach | B05B 11/045 222/215 |
| 2,981,444 | A | * | 4/1961 | Root | A61M 13/00 222/211 |
| 3,572,590 | A | * | 3/1971 | Malone | B05B 11/043 239/326 |
| 4,007,858 | A | * | 2/1977 | Shay | A45D 33/02 222/633 |
| 4,015,753 | A | * | 4/1977 | Bennett | B05B 11/045 222/209 |
| 4,091,966 | A | * | 5/1978 | Laauwe | B05B 11/0059 222/211 |
| 4,261,488 | A | * | 4/1981 | Bennett | B05B 11/045 222/211 |
| 4,278,206 | A | * | 7/1981 | Prussin | A01N 25/06 222/215 |
| 4,307,823 | A | * | 12/1981 | Heiss | B05B 11/062 222/211 |
| 4,548,524 | A | * | 10/1985 | Seager | A45D 34/042 222/205 |
| 4,763,817 | A | * | 8/1988 | Lee | B67D 7/0216 222/207 |
| 5,881,925 | A | * | 3/1999 | Ando | B05B 11/0078 222/190 |
| 5,971,234 | A | * | 10/1999 | Mathison | B05B 11/045 222/211 |
| 7,465,287 | B2 | * | 12/2008 | James | A45D 33/02 604/58 |
| 7,690,536 | B2 | * | 4/2010 | Briozzo Fernandez | B05B 7/0037 222/190 |
| 8,657,794 | B2 | * | 2/2014 | Carpenter | A61M 3/0262 222/213 |
| 9,708,093 | B2 | * | 7/2017 | Romanov | B65D 1/323 |
| 2009/0008415 | A1 | * | 1/2009 | Ohshima | B05B 11/0018 222/383.1 |
| 2009/0326442 | A1 | * | 12/2009 | Ross | B05B 11/025 604/48 |
| 2014/0239021 | A1 | * | 8/2014 | Xufeng | B05B 1/267 222/631 |
| 2017/0181956 | A1 | * | 6/2017 | Lambridis | A61K 8/891 |

FOREIGN PATENT DOCUMENTS

| | | |
|---|---|---|
| KR | 10-1081470 B1 | 11/2011 |
| KR | 20-0466447 Y1 | 4/2013 |

\* cited by examiner

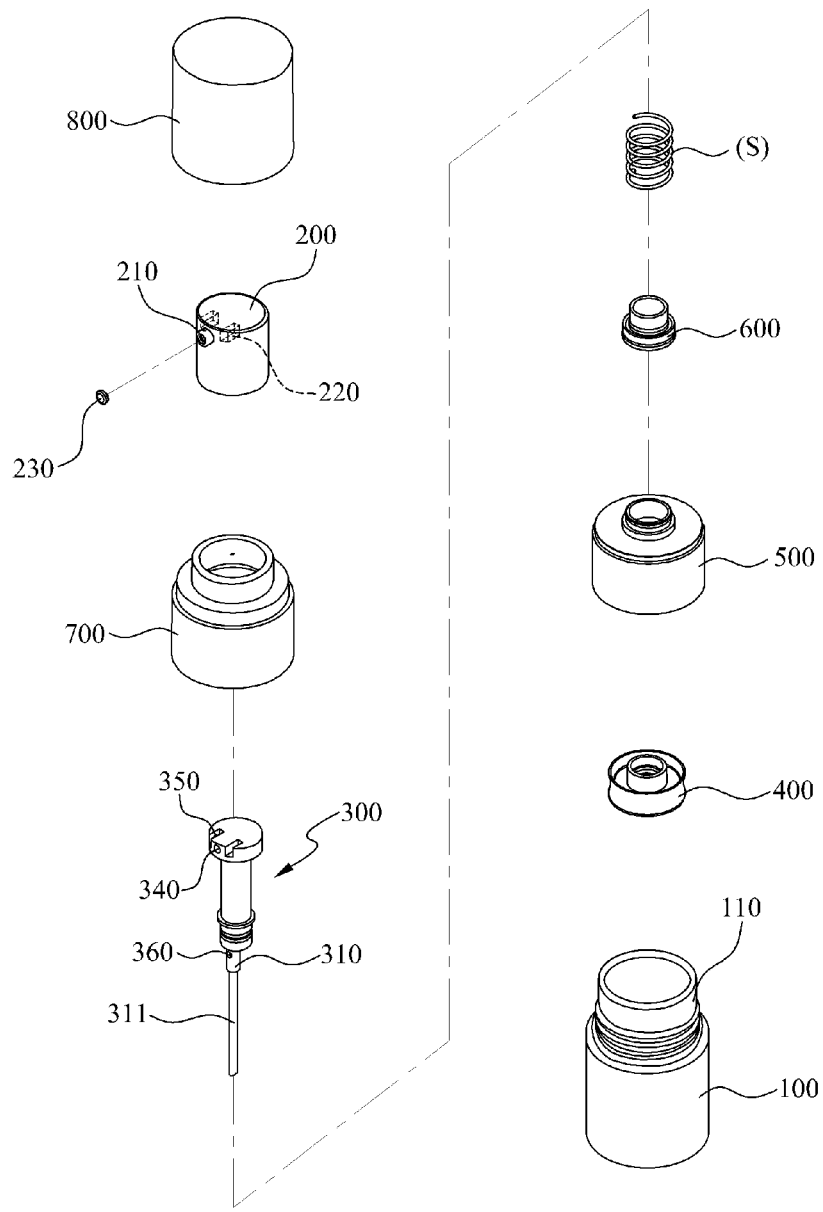

[Fig. 2]
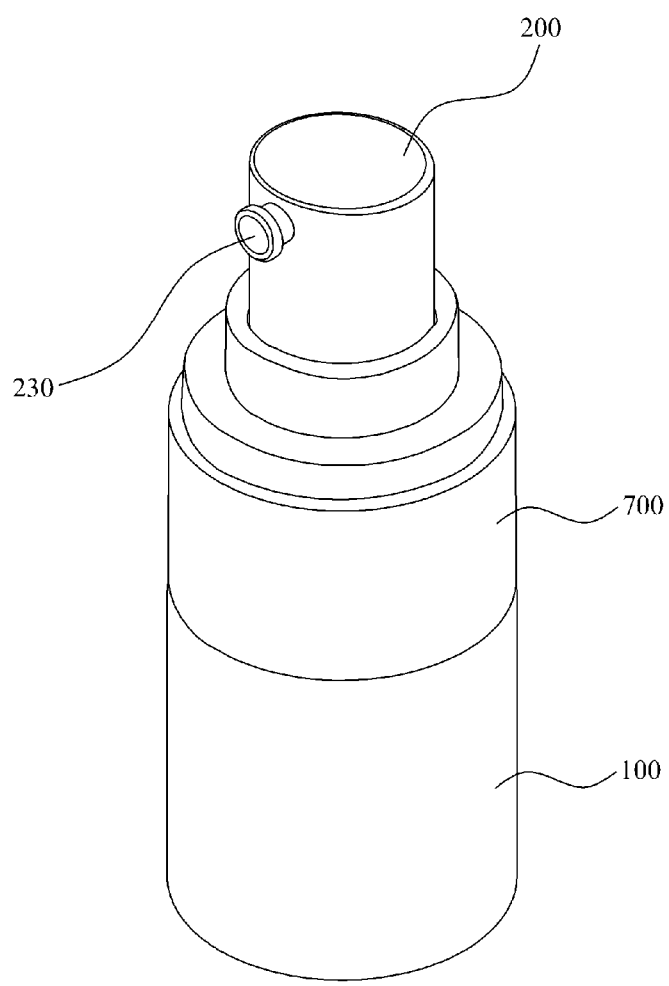

[Fig. 3]
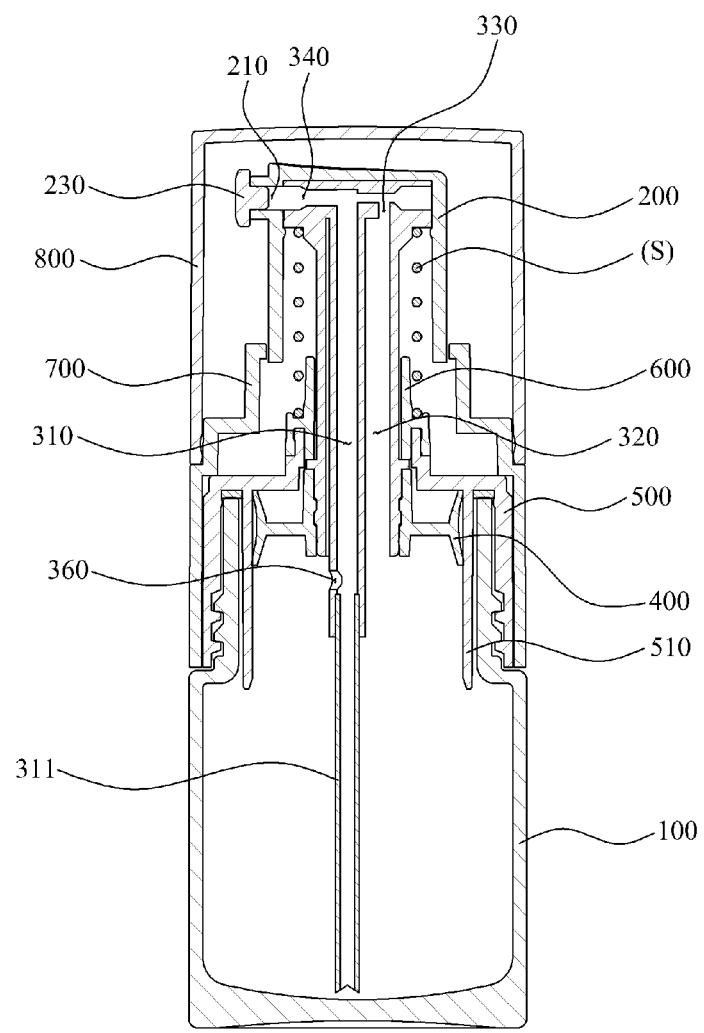

[Fig. 4]
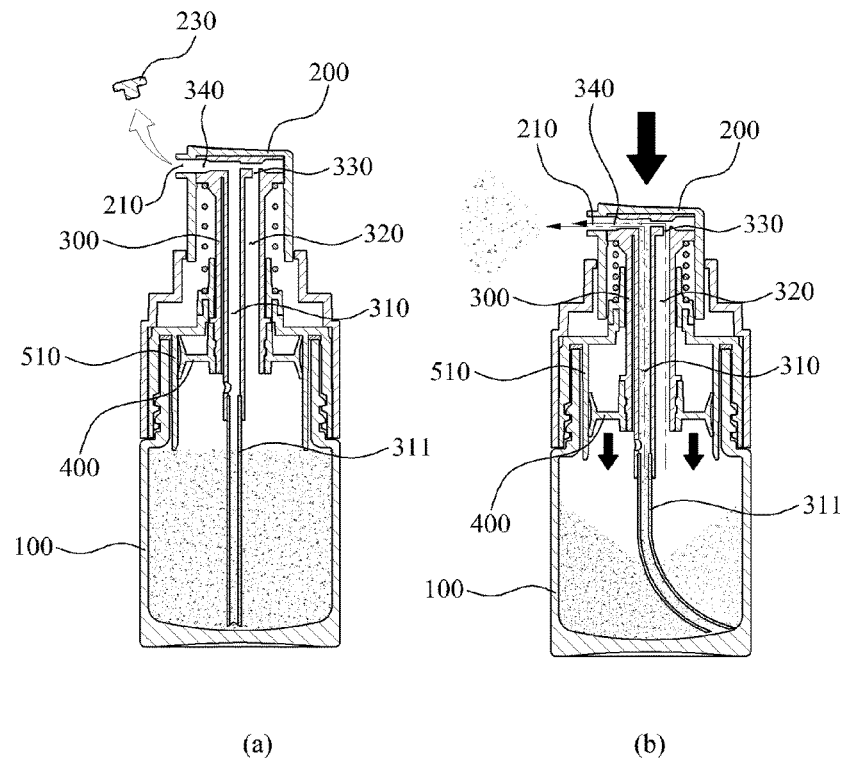
(a)  (b)
[Fig. 5]
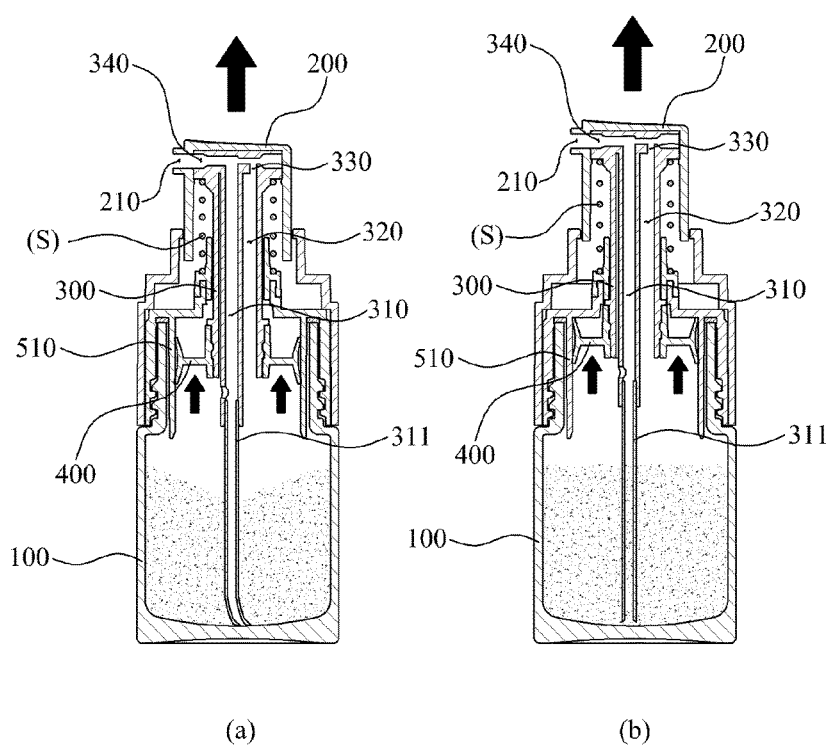
(a)  (b)

[Fig. 6]
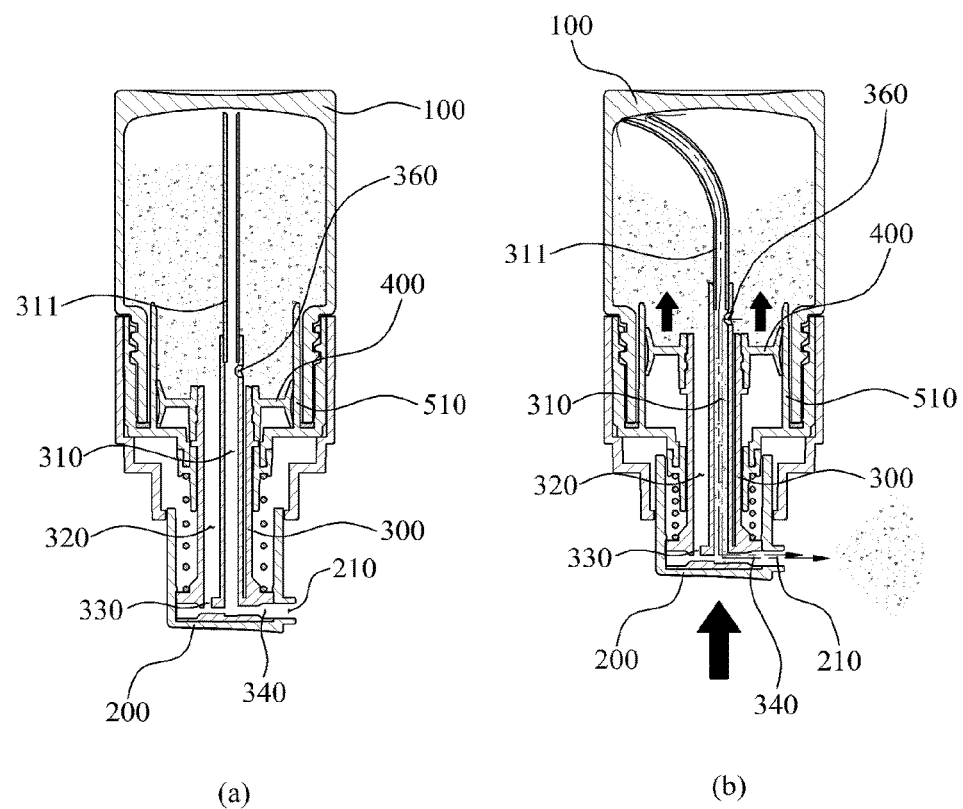
(a)     (b)

POWDER DISCHARGING CONTAINER

BACKGROUND OF THE INVENTION

The present invention disclosed herein relates to a powder-discharging container comprising an air passageway and a powder passageway, which are formed on the inside of a stem, so that air and powder can pass through separately, thereby enabling spraying of powder passing through the powder passageway by means of air passing through the air passageway, when a button portion is pressed.

Generally, power has its good wearability when applied on skin and its high water-repellency, such that power is widely being used because a user feels fresh on the skin and get her makeup to look natural.

When applying a power-type makeup, a user usually applies power contained in a container body of a powder container, smearing with a puff that is separately equipped. This type of power container is disclosed in Korean Registered Patent No. 10-1171305. (Hereafter, referred as 'the registered patent')

The above registered patent is to provide a space wherein powder is filled therein, comprising a container body (10) having an upper surface opened and a bottom surface with an air inlet hole(10h); a pumping means (30) having a diaphragm (31), which is an element made of elastic material with a cylindrical shape such that a rim of a lower portion can be folded into a rim of a bottom surface of the container body (10), absorbing air in by a pumping operation and discharging the air into the space wherein the powder is filled outwardly through an air discharging hole (31h) formed at a center thereof, and an opening/closing button (35) which control an opening/closing of the air discharging hole (31h) which is equipped at an upper center of the diaphragm (31); a fixing plate (40) configured to be able to ascend/descend but to be prevented from being rotated in a state that an outer circumferential surface is closely contacted to an inner surface at an upper side of the pumping means (30), comprising a multitude of lower part holes (40h) wherein powder particles pass through; an operational plate (50) equipped to be able to make a restricted rotation to the fixing plate (40), comprising a lower part hole (40h) and an upper part hole (50h) so as to control an opening/closing of the lower part hole (40h); a cap (20) tightened with a screw so as to cover an opened upper surface of the container body (10), and configured for an inner side surface to have a friction contact with an outer side surface of the operational plate (50), thereby connecting the operational plate and rotating when tightened with the container body (10).

The registered patent above has a configuration that when powder is tapped lightly with a puff (60) or pressurized in a state of a cap (20) being opened, powder comes to be discharged and can be applied to the puff (60); however, a user should hold the puff (60) with one hand and then pressurize an operational plate (50) while holding the container body (10) with the other hand, which leads to user inconvenience.

Therefore, for user convenience, it is necessary to develop a powder-discharging container that enables powder to be discharged onto a user's face by simply spraying.

SUMMARY OF THE INVENTION

The present invention is devised to solve such problems described in the above, and the objective thereof is to provide a powder-discharging container having an air passageway and a powder passageway, which are formed on the inside of a stem, so that air and powder can pass through separately, thereby enabling spraying of powder passing through the powder passageway by means of air passing through the air passageway, when a button portion is pressed.

Another objective is to provide a powder-discharging container wherein a powder-absorbing tube coupled to a lower portion of a powder passageway moves upward or downward according to the presence or absence of pressurizing and stirs powder stored in a container body, thereby enhancing a smooth discharge of powder.

To solve problems above, a powder-discharging container, according to first embodiments of the present invention, is characterized to include: a container body storing powder therein; a button part disposed at an upper portion of the container body to be able to ascend or descend according to the presence or absence of a user's pressurizing, further comprising a discharging outlet at an one side to discharge powder; and a stem coupled to a lower portion of the button and moving according to the movement of the button part, wherein a powder passageway wherein powder moves and an air passageway at wherein air moves are equipped separately at an inner side thereof.

The container is characterized in that according to pressurizing the button part, an inner pressure of the container body changes, and powder and air move respectively through the powder passageway and the air passageway into the interior of the stem and are discharged through the discharging hole by air pressure.

Furthermore, the container is characterized in that a support body is coupled to an upper portion of the container body and further comprises an extending part which extends to a lower portion so as to encase an upper portion of an inner circumferential surface of the container body at the upper end of a bottom surface thereof.

Furthermore, the container is characterized in that at a lower portion of the stem is coupled a piston which is closely contacted to an inner circumferential surface of the extending part so as to move along with the ascent/descent of the stem.

Furthermore, the container is characterized in that at a dead-end of the air passageway of the stem is equipped an air-compressing hole which has a smaller caliber than the air passageway to make it possible to compress and discharge air.

Furthermore, the container is characterized in that at the stem is equipped a connecting hole which is connected with a discharging hole such that powder moving to an upper portion by controlling the button part may be discharged to the discharging hole.

Furthermore, the container is characterized in that at an upper end of the stem is equipped a coupling groove which provides a directional property of the button part such that a discharging hole of the button part and a connecting hole of the stem can be connected, and at an inner side of the button part is equipped a coupling protrusion which is coupled to the coupling groove.

Furthermore, the container is characterized in that at a lower portion of the powder passageway is coupled a powder-absorbing tube which moves powder stored in the container body to the powder passageway.

Furthermore, the container is characterized in that the powder-absorbing tube stirs powder stored in the container body, while moving upward/downward according to the presence or absence of pressurization of the button part.

Furthermore, the container is characterized in that at a lower portion of the stem is equipped a powder-moving hole which functions as a passageway wherein powder moves when the button is pressurized in a state of the container body being kept upside down, and the powder-absorbing tube functions as a passageway wherein air stored in the container body moves.

Furthermore, the container is characterized in that at the button part is coupled an opening/closing member which opens/closes the discharging hole.

As described as the above, according to the present invention, a powder-discharging container has an advantage in that an inner pressure changes by a piston coupled at a lower portion of the stem when a button part is pressurized, and thereby, air and powder move respectively to an air passageway and a powder-moving hole provided at inner side of the stem, and then the air which moves through an air passageway at an inner side of the button part can discharge powder like spray.

Furthermore, the container has another advantage in that according to the presence or absence of pressurizing, a powder-absorbing tube coupled to a lower portion of a powder passageway, as moving upward/downward, stirs powder stored in the container body, thereby allowing powder to be discharged smoothly.

BRIEF DESCRIPTION OF THE DRAWINGS

FIG. 1 is an exploded perspective view illustrating a configuration of a powder-discharging container according to a first exemplary embodiment of the present invention.

FIG. 2 is a combined perspective view illustrating a configuration of a powder-discharging container according to a first exemplary embodiment of the present invention.

FIG. 3 is a cross-sectional view illustrating a configuration of a powder-discharging container according to a first exemplary embodiment of the present invention.

FIGS. 4 to 5 are views illustrating an operational state of a powder-discharging container according to a first exemplary embodiment of the present invention.

FIG. 6 is a view illustrating an operational state in a state of a container body of a powder-discharging container being kept upside down according to a first exemplary embodiment of the present invention.

DETAILED DESCRIPTION OF PREFERRED EMBODIMENTS

Hereinafter, exemplary embodiments of the present invention will be described in detail with reference to the accompanying drawings. The same reference numerals provided in the drawings indicate the same members.

FIG. 1 is an exploded perspective view illustrating a configuration of a powder-discharging container according to a first exemplary embodiment of the present invention, FIG. 2 is a combined perspective view illustrating a configuration of a powder-discharging container according to a first exemplary embodiment of the present invention, and FIG. 3 is a cross-sectional view illustrating a configuration of a powder-discharging container according to a first exemplary embodiment of the present invention.

Referring to FIGS. 1 to 3, a powder-discharging according to an exemplary embodiment of the present invention includes a container body 100, a button part 200, and a stem 300.

The container body 100 containing powder comprises a discharging outlet 110 at an upper portion thereof such that the powder contained can be discharged.

At an upper portion of the container body 100 is coupled a support body 500 which is coupled to the discharging outlet 110 and closes an upper end of the discharging outlet 110 and, according to the present invention, it is characterized that at a bottom surface of an upper end of the support body 500 is equipped an extending part 510 which is extended to a lower portion thereof so as to encase an upper inner circumferential surface of the container body 100, wherein at an inner side of the extending part 510 is equipped a piston 400 which ascends/descends in a state of being tightly contacted with an inner circumferential surface of the extending part 510, and changes an inner pressure of the container body 100.

Meanwhile, at an upper portion of the container body 100 is coupled a shoulder part 700, encasing the support body 500, wherein the shoulder part 700 comprises a hollow such that a button part 200 to be explained later is inserted and ascended/descended, and at an outer side is coupled an over cap 800 which encases the button part 200 to prevent malfunction of the button part 200.

The button part 200 is coupled to a stem 300 at an upper portion of the container body 100 and delivers pressure to the stem 300 as being ascended/descended according to the presence or absence of a user's pressurizing, comprising a discharging hole 210 at one side thereof such that powder can be discharged, wherein at an inner side of the button part 200 is coupled a coupling protrusion 220 coupled to a coupling groove 350 of the stem 300 so as to provide a directional property when assembled with the stem 300 such that the discharging hole 210 and an connecting hole 340 of the stem 300 can be communicated.

Meanwhile, at the button part 200 is coupled an opening/closing member 230 which opens/closes the discharging hole 210 so as to be detachable.

At a lower portion of the button part 200 is installed a spring (S) that provides elasticity force to an upward direction as releasing the pressurizing force generated when a user presses the button 200, wherein the spring (S) is installed between a stem 300 to be explained later and a spring support part 600 coupled to an upper portion of the support body 500 and provides an elasticity force to a stem 300, thereby making it possible for the button 200 to be restored.

The stem 300 is coupled to a lower portion of the button part 200 and moves along as the button part 200 moves, wherein it is characterized, according to the present invention, that at an inner side of the stem 300 is separately equipped a powder passageway 310 wherein powder moves and an air passageway 320 wherein air moves.

At a lower portion of the stem 300 is coupled a piston 400 which closely contacts to an inner circumferential surface of the extending part 510 so as to move along with the ascent/descent of the stem 300 and thereby change an inner pressure of the container body 100, wherein the piston 400 ascends/descends in a state of being closely contacted to an inner circumferential surface of the extending part 510 according to whether or not pressure is applied to the button part 200, and thereby changes an inner pressure of the container body 100, such that powder and air can move upward through the powder passageway 310 and the air passageway 320, and be discharged through a discharging outlet 210 of the button part 200.

At a side surface of the stem 300 is equipped a connecting hole 340 communicated with a discharging hole 210 such that powder moving to an upper portion by operation of the button part 200 can be discharged to the discharging hole 210 of the button part 200, and at an upper end of the stem 300 is equipped a coupling groove 350 coupled with a coupling protrusion 220 of the button part 200 to provide a directional property such that a discharging hole 210 of the button part 200 and a connecting hole 340 of the stem 300 can be communicated in the process of assembling with the button part 200.

Meanwhile, the present invention is characterized in that at a dead-end of the air passageway 320 is equipped an air-compressing hole 330 which has a smaller caliber than the air passageway 320 does, wherein air moving through the air passageway 320 compresses air as moving through the air passageway 320 and then discharges, such that it is possible to discharge powder moving through a powder passageway 310 by way of the discharging hole 210.

Furthermore, a powder-absorbing tube 311 is coupled at a lower portion of the powder passageway 310 for moving powder stored in the container body 100 to the powder passageway 310, wherein the present invention is characterized in that the powder-absorbing tube 311 is configured to move powder as moving along with the stem 300 when the stem 300 ascends/descends according to whether pressure is applied to the button part 200.

Unlike fluid, powder is not likely to maintain level or fill empty space if not particularly shaken after being discharged, which cause a problem that powder won't be discharged properly due to empty spaces when in the next use. However, a powder-absorbing tube 311 of the present invention is configured to be moved upward/downward by the control of the button part 200, such that in the process of an upward/downward movement, powder stored in the container body 100 can be stirred and thereby make it possible to fill spaces to some degree and discharge powder smoothly.

The powder absorbing tube 311 is preferred to be made of soft flexible materials not to interfere with a bottom surface of the container body 100 in a process of moving upward/downward.

Meanwhile, it is characterized that at a lower portion of the stem 300 is equipped a powder-moving hole 360 which functions as a passageway where powder moves when the button part 200 is pressed in a state of the container body 100 being kept upside down, and, as shown in FIG. 6, when the button part 200 is pressed in a state of the container body 100 being kept upside down, powder moves through the powder-moving hole 360. At this time, a powder-absorbing tube 311 functions as a passageway where air stored in the container body 100, and it is possible that powder is absorbed through the powder-moving hole 360 and discharged through the discharging hole 210 in a process of air moving through a powder-absorbing tube 311.

Hereinafter, with reference to FIGS. 4 and 5, a powder-discharging process of a powder-discharging container according to a first exemplary embodiment of the present invention will be described.

FIGS. 4 and 5 are views illustrating an operational state of a powder-discharging container according to a first exemplary embodiment of the present invention.

Referring FIGS. 4 and 5, after an opening/closing member 230 which opens/closes a discharging hole 210 of a button part 200 is separated and opens a discharging hole 210, when the button part 200 is pressurized, a stem 300 coupled at a lower portion of the button part 200 descends; at this time, a piston 400 coupled at a lower portion of the stem 300 descends in a state of being contacted to an inner circumferential surface of an extending part 510, and thereby causes an inner pressure of the stem 300 to be changed.

When the inner pressure of the container body 100 is changed through the above procedure, powder is absorbed through a powder-absorbing passageway 311 in a process that the air stored in the container body 100 is discharged to a discharging hole 210 via an air passageway 320 and thereby powder is moved to a powder passageway 310, wherein the air moving through an air passageway 320 compresses air and discharges as moving through an air-compressing hole 330, thereby allowing powder moving through a power passageway 310 to be discharged through a discharging hole 210.

The present invention is configured for a user to directly spray and apply powder to a wanted area of his/her body or hair, which will lead to user convenience. Furthermore, when a user applies powder for makeup by means of a puff, it is possible to spray powder on the puff and then apply the powder onto a face.

As described above, optimal embodiments have been disclosed in the drawings and the specification. Although specific terms have been used herein, these are only intended to describe the present invention and are not intended to limit the meanings of the terms or to restrict the scope of the present invention as disclosed in the accompanying claims. Therefore, those skilled in the art will appreciate that various modifications and other equivalent embodiments are possible from the above embodiments. Therefore, the scope of the present invention should be defined by the technical spirit of the accompanying claims.

What is claimed is:

1. A powder-discharging container comprising:
    a container body containing powder;
    a button part disposed at an upper portion of the container body and ascending or descending according, respectively, to the absence or presence of pressure applied to the button part, further comprising a discharging hole at one side thereof such that powder is discharged;
    a stem coupled to a lower portion of the button part and moving along with the movement of the button part, at an inner side thereof separately comprising a powder passageway wherein powder moves and an air passageway wherein air moves; and
    a support body coupled to an upper portion of the container body, the support body, at a bottom surface of an upper end thereof, equipped with an extending part which extends toward a lower portion of the container body so as to encase an upper inner circumferential surface thereof,
    wherein a piston is coupled at a lower portion of the stem, and closely contacted to an inner circumferential surface of the extending part such that the piston moves along with ascent or descent of the stem and thereby changes an inner pressure of the container body, and
    wherein an inner pressure of the container body changes according to whether pressure is applied to the button part, and powder and air move into the stem respectively through the powder passageway and the air passageway, thereby making powder discharged by air pressure through the discharging hole.

2. The powder-discharging container of claim 1,
    wherein an air-compressing hole is equipped at a dead-end of the air passageway of the stem, having a smaller caliber than the air passageway such that powder moving upward by control of the button part can be discharged to the discharging hole.

3. The powder-discharging container of claim 1,
    wherein a connecting hole is equipped at the stem, connected with the discharging hole such that powder moving upward by the control of the button part can be discharged to the discharging hole.

4. The powder-discharging container claim 3,
wherein a coupling groove is equipped at an upper end of the stem, providing a directional property when the button part is assembled such that a discharging hole of the button part and a connecting hole of the stem can be communicated with,
wherein a coupling protrusion is coupled to the coupling groove at an inner side of the button part.

5. The powder-discharging container of claim 1,
wherein a powder-absorbing tube is coupled at a lower portion of the powder passageway moving powder stored in the container body to the powder passageway.

6. The powder-discharging container of claim 5,
wherein the powder-absorbing tube stirs powder stored in the container body by moving upward or downward according, respectively, to the absence or presence of pressure applied to the button part.

7. The powder-discharging container of claim 5,
wherein a powder-moving hole equipped at a lower portion of the stem functions as a passageway where powder moves when the button part is pressurized in a state of the container body being kept upside down,
wherein the powder-absorbing tube functions as a passageway wherein air stored in the container body moves.

8. The powder-discharging container of claim 1,
wherein an opening/closing member is coupled detachably at the button part so as to open/close the discharging hole.

\* \* \* \* \*